July 26, 1955  C. ROEHRI  2,713,797
PRESSURE APPLYING AND LOCKING APPARATUS
Filed Aug. 24, 1953  4 Sheets-Sheet 1
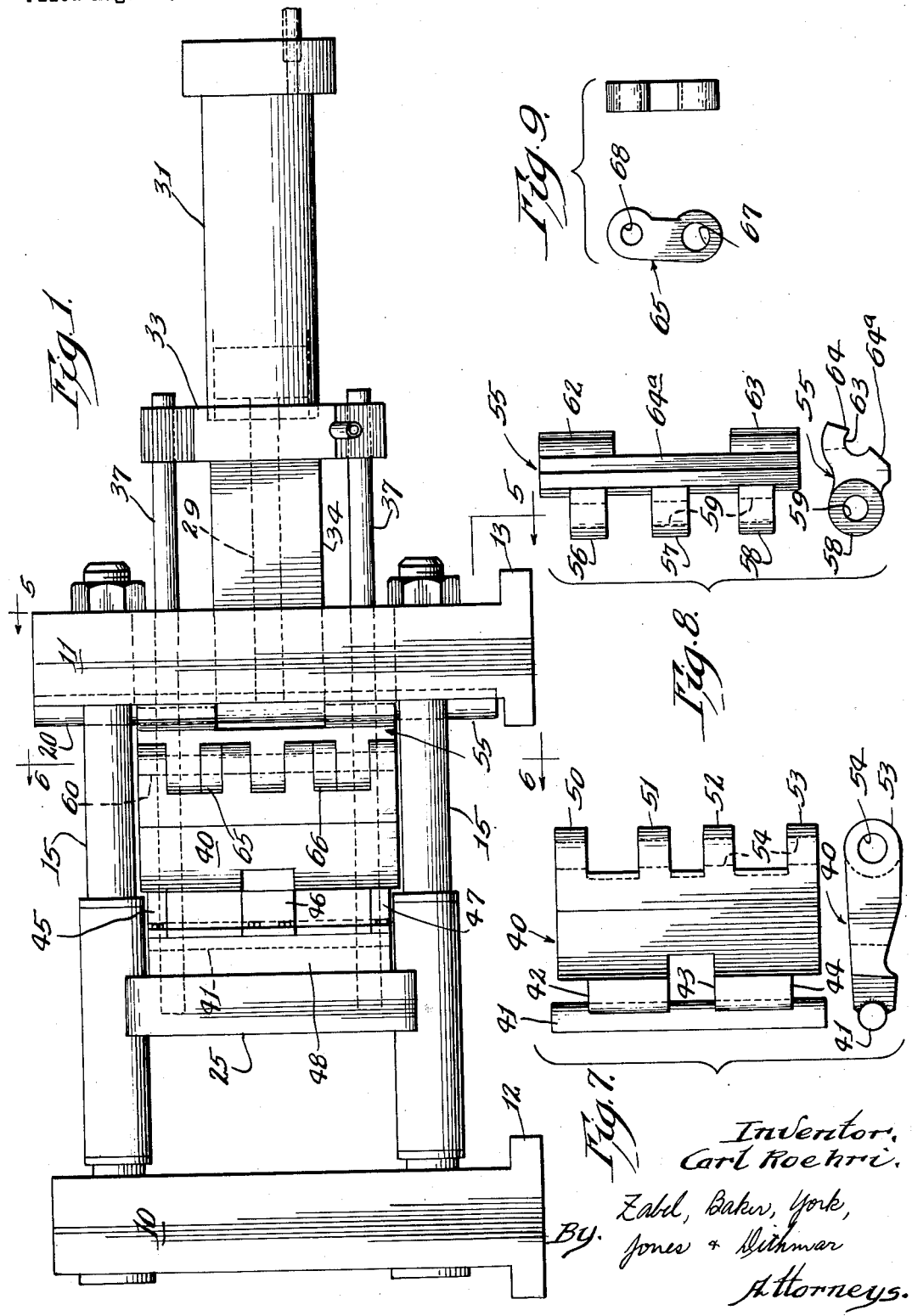

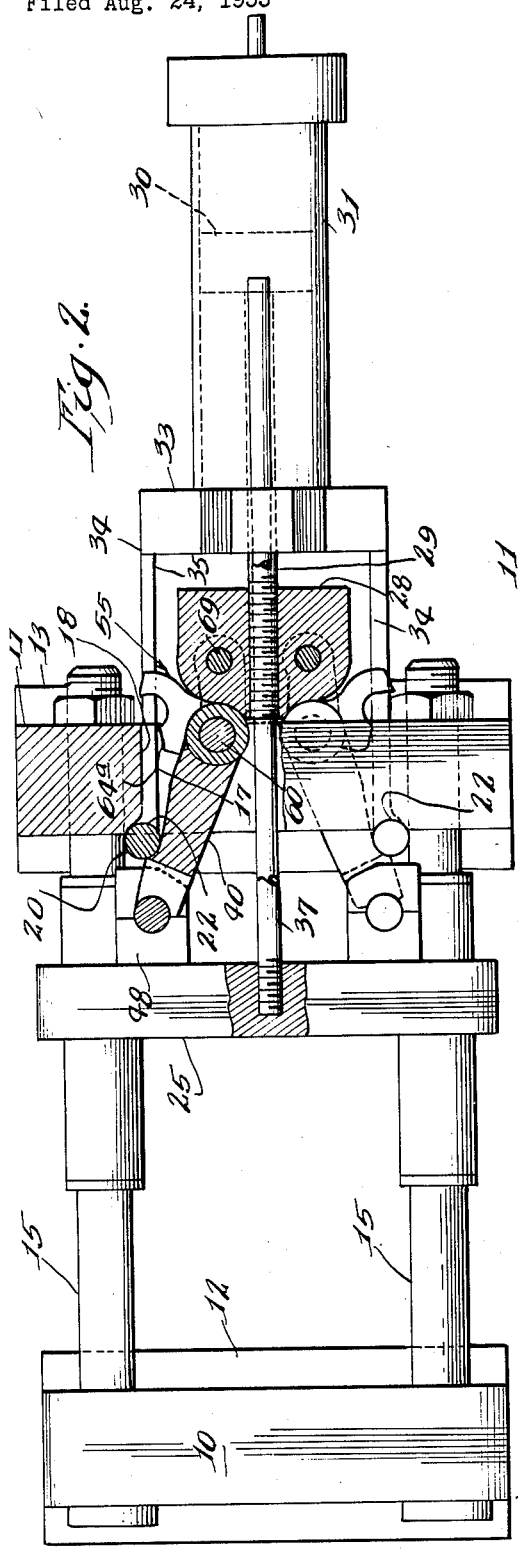
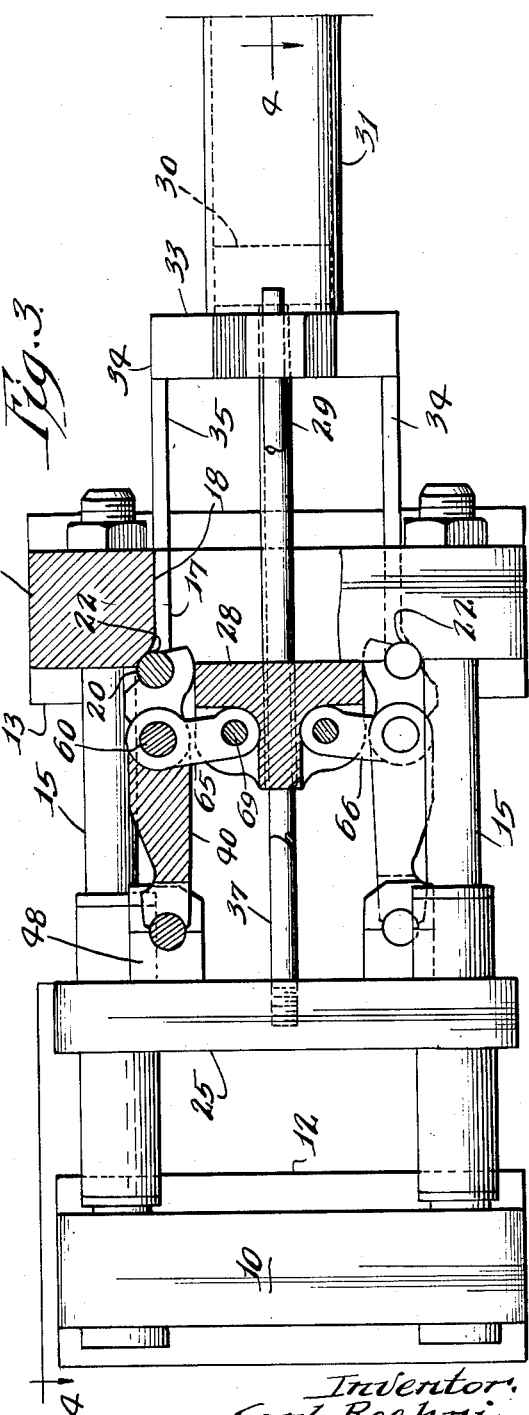

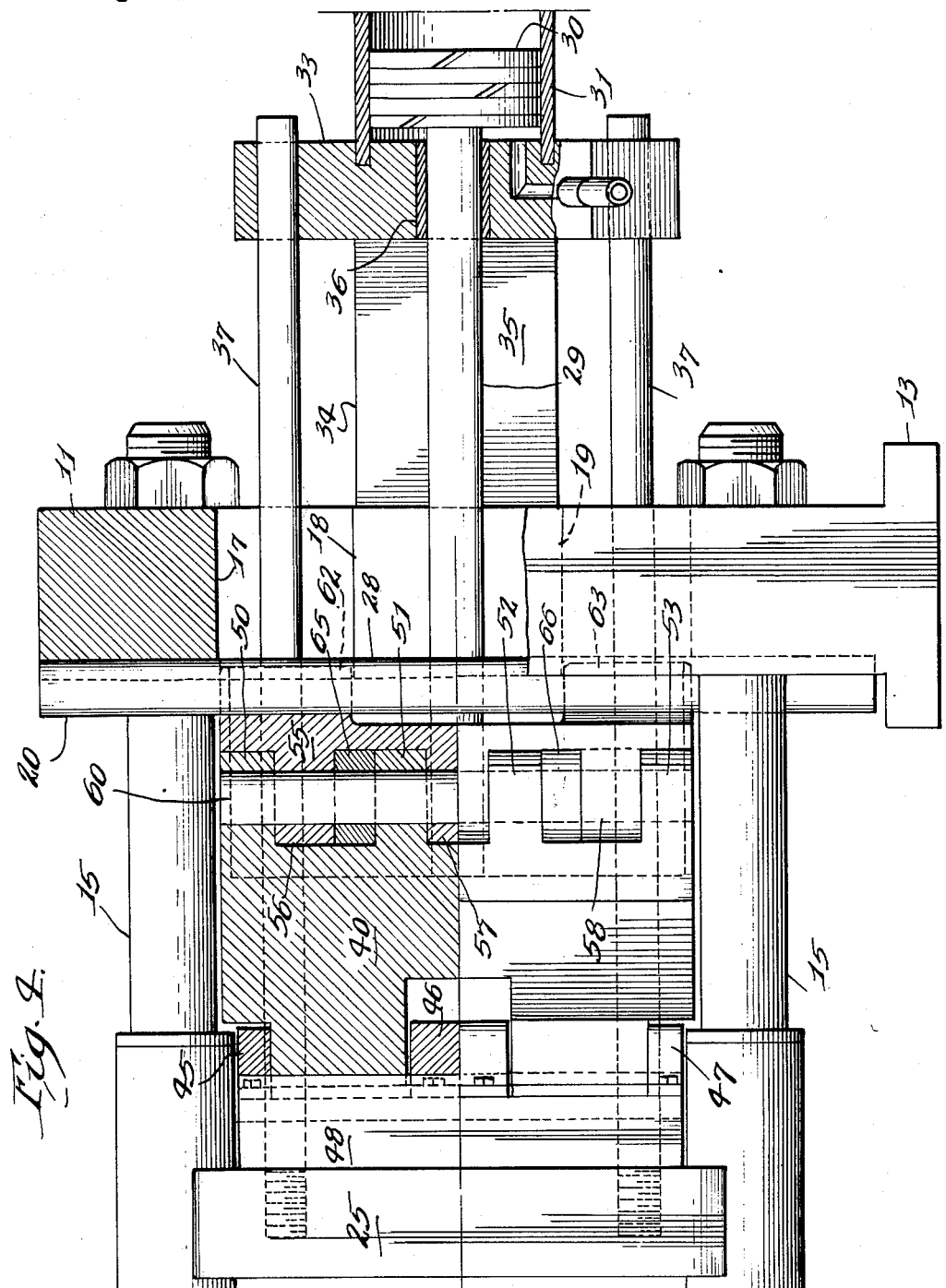

July 26, 1955 C. ROEHRI 2,713,797
PRESSURE APPLYING AND LOCKING APPARATUS
Filed Aug. 24, 1953 4 Sheets-Sheet 4
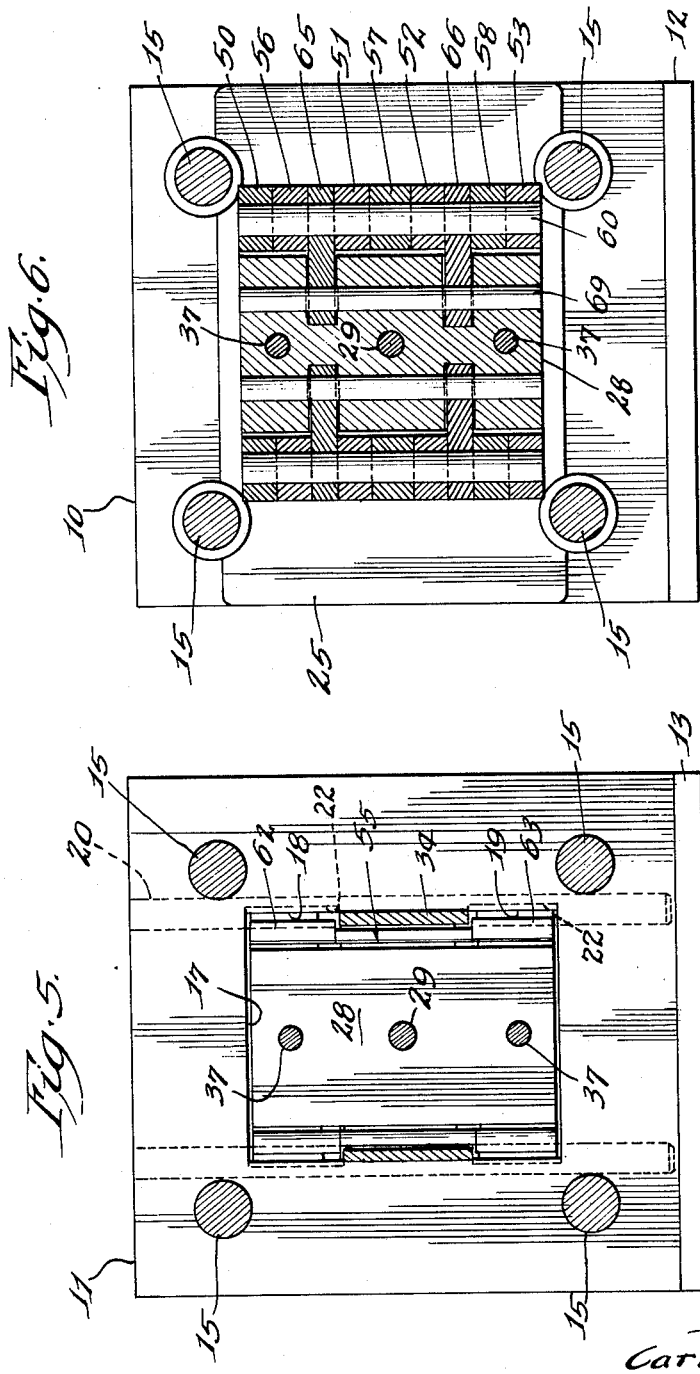
Inventor.
Carl Roehri.
By. Zabel, Baker, York, Jones & Dithmar
Attorneys.

2,713,797

PRESSURE APPLYING AND LOCKING APPARATUS

Carl Roehri, Niles, Ill.

Application August 24, 1953, Serial No. 376,035

6 Claims. (Cl. 74—110)

My invention relates generally to pressure applying and locking apparatus.

Apparatus embodying my invention has utility in various machine tools, and, by way of example, it has particular utility in machines for producing metal die-castings or injection molded plastic products. For convenience, the invention will be illustrated and described in connection with a die-casting machine.

This invention is an improvement on the invention described and claimed in my prior U. S. Patent No. 2,460,658, dated February 1, 1949, and on the invention forming the subject matter of my copending U. S. patent application Serial No. 284,675, filed April 28, 1952.

A machine for producing die-castings comprises a framework having a stationary member which carries one portion of a die and a guided movable member which carries a cooperating portion of the die. The movable member functions to bring the two die portions into cooperative relation under substantial pressure and to maintain the pressure relation for a substantial time period.

This invention, as well as those shown in my aforesaid prior patent and copending application, provides apparatus adapted to force the two die portions together under substantial pressure, and the apparatus then assumes a locked condition whereby the substantial pressure is maintained on the die portions without applying further external force.

The invention is characterized by an ability to provide a working stroke of substantial length. Other factors being equal, the stroke length afforded by the present apparatus is substantially greater than that afforded by the apparatus disclosed in my prior patent and application. The matter of substantial stroke length is one of extreme importance in this art for the reason that dies having a deep draft may be used with the apparatus, thereby materially increasing the capabilities of a machine embodying the apparatus.

Another distinguishing characteristic of this invention, compared with my former ones, is an ability to develop an extremely large force at the start of the retractile stroke, and this large force is maintained for a portion of the stroke which is sufficiently long to satisfy the requirements of deep draft dies.

The extremely large force provided by this apparatus both at the end of the forward stroke and at the beginning of the retractile stroke is developed through the action of a toggle-joint, and this joint also cooperates to provide the aforesaid locking action. The toggle joint is actuated by a link which moves the toggle to an "on center" position, the link being effective to hold the toggle in this position without requiring the application of external holding force.

The toggle-joint, when effective in the operation of the apparatus, extends between a fixed part of the machine framework and the movable die-carrying member. The joint, however, is so constructed that during a portion of the stroke it is disengaged from the fixed part of the machine, thereby permitting a stroke which is substantially longer, other factors being equal, than a stroke limited as to length by a toggle-joint incapable of such disengagement. As previously mentioned, increased stroke length enables the use of a greater variety of dies and thus the production of a greater variety of die-cast products.

Another distinguishing characteristic of this apparatus is the provision of channels and other guideways which limit the path of the disengageable portion of the toggle-joint and thus maintain such portion in proper position to establish the toggle-joint near the end of the forward stroke of the apparatus. These channels and other guideways, as will be seen, cooperate with the disengageable portion of the toggle-joint during both the forward stroke and the retractile stroke.

The apparatus also is provided with other guide members which are effective to maintain proper alignment between various fixed and movable portions of the apparatus. The improved alignment produced by these guide members contributes materially to smooth operation and comparative absence of impact and noise, factors of substantial importance in massive apparatus of this character.

Apparatus embodying this invention is generally symmetrical with respect to a central, longitudinal, vertical plane as compared with the apparatus of my said prior patent which is generally symmetrical with respect to a central horizontal plane. This feature provides certain advantages, as will be seen.

Other objects, advantages, features and characteristics of the invention will become apparent as the description proceeds, reference being had to the accompanying drawings which illustrate one form of the invention. It is to be understood, of course, that in commercial applications of the invention various details might well vary somewhat from those here shown and described.

In the drawings:

Fig. 1 is a side elevational view of a machine for producing die-castings embodying the apparatus of my invention, the parts of the apparatus being shown in fully extended position and locked in pressure applying relation;

Fig. 2 is a top view, partly in section, illustrating the apparatus with its parts in fully retracted position;

Fig. 3 is a top view, partly in section, illustrating the apparatus with its parts in fully extended position and locked in pressure applying relation;

Fig. 4 is an enlarged side elevational view, partly in section, of a portion of the apparatus showing various details thereof;

Fig. 5 is a sectional view on line 5—5 of Fig. 1;

Fig. 6 is a sectional view on line 6—6 of Fig. 1;

Figs. 7, 8 and 9 illustrate details of certain parts making up the toggle-joint used in the apparatus.

Referring now to the drawings, a machine embodying my invention includes a framework having a front stationary member 10 and a rear stationary member 11. Members 10 and 11 have enlarged feet 12 and 13, respectively, which rest on a suitable supporting surface. Elongated bars 15 extend between members 10 and 11 and position the latter a predetermined distance apart. They also have a guiding function as will later appear.

Since the machine is generally symmetrical about a vertical, longitudinally extending plane, only the parts lying on one side of such plane will be described in detail, for the most part.

Rear stationary member 11, as best shown in Fig. 5, has a central opening 17 which is generally rectangular in shape. A part of each lateral edge of opening 17 is relieved as shown at 18 and 19, the relieved portions extending through the thickness dimension of member 11 and forming channels which for convenience may sometimes be referred to as channels 18 and 19.

A vertically extending shaft 20 is fixed on the front side of rear stationary member 11 along each lateral edge of central opening 17 (Figs. 1–5). Shaft 20 is so positioned along the lateral edge of opening 17 that relieved portions 18 and 19 of the opening expose a substantial portion of the rear side of the shaft.

It is to be noted that shaft 20 engages member 11 substantially throughout the shaft length. Thus, during apparatus operation, as will be seen, the only stresses which develop in shaft 20 are compressive stresses. This construction is a significant improvement over the corresponding arrangements disclosed in my prior patent and application where substantial shear stresses are developed in the shaft. Elimination of shear stresses from the instant shaft in favor of compressive stresses improves the pressure applying capabilities of the machine by a factor of at least eight.

As best shown in Figs. 2 and 3, relieved portions or channels 18 and 19 of central opening 17 are further relieved adjacent shaft 20 to provide recesses 22. These recesses, as will be seen later, cooperate to develop increased force during the initial portion of the retractile stroke. This increased force during such portion of the retractile stroke enables the use of extremely deep draft dies with a machine embodying my invention. Recesses 22 also cooperate during initial engagement of the toggle-joint arrangement with shaft 20 during the forward stroke, as will be seen.

A driven member 25 has a sliding relation with bars 15, and, during machine operation, driven member 25 travels along bars 15 toward and away from front stationary member 10. Die portions (not shown) are respectively carried on members 10 and 25 for conventional cooperative action.

Referring to Figs. 2, 3, 5 and 6, a cross-head or driving member 28 is adapted to travel back and forth through central opening 17 of rear stationary member 11. Driving member 28 has secured thereto a connecting rod 29 which extends to a piston 30 mounted for travel in a cylinder 31. Any suitable fluid and valve system may be used to move piston 30 back and forth in cylinder 31.

Cylinder 31 is mounted on a yoke 33 which includes arms 34 secured to the rear surface of rear stationary member 11. The inside surfaces 35 of arms 34 are aligned with the unrelieved portions of the lateral edges of central opening 17, such surfaces thus forming extensions of these portions. As will be seen, these unrelieved portions and surfaces 35 constitute guideways for the disengageable part of the toggle-joint arrangement and cooperate to provide the aforesaid extended stroke length. Connecting rod 29 is journalled in a bearing 36 (Fig. 4) extending through yoke 33.

Proper alignment between driven member 25, driving member 28 and yoke 33 is insured by the provision of a pair of spaced shafts or guide members 37. These guide members 37 are carried by and project at right angles from the rear side of driven member 25, as best shown in Figs. 2 and 3. Members 37 extend rearwardly through aligned apertures in driving member 28 and yoke 33, the length of the guide members being such that the free ends thereof extend through yoke 33 even when driven member 25 is in its forwardmost position (Fig. 3).

The pressure applying and locking portion of the apparatus comprises a part-time disengageable toggle-joint which extends between driven member 25 and shaft 20, the toggle-joint also being operatively related to driving member 28 so the latter may impart movement to driven member 25 during the portion of the stroke when the toggle-joint itself is disengaged.

The toggle-joint arrangement includes two main links, one a long link 40 which is shown in detail in Fig. 7. Long link 40 has a shaft 41 extending along one link end, the end having a semi-cylindrical recess to provide a seat for the shaft. Shaft 41 is welded or otherwise suitably secured to link 40. The link end adjacent shaft 41 is relieved as shown at 42, 43 and 44 to receive U-shaped bearings 45, 46 and 47 (Figs. 1 and 4) which partially surround shaft 41 and are secured to driven member 25. The latter has a bearing portion 48 (Figs. 2 and 3) provided with a semi-cylindrical recess which forms a seat for shaft 41.

The relationship between long link 40 and driven member 25 thus is such that only compressive stresses are developed in shaft 41 during the forward or closing stroke. Further, it will be seen that this relationship provides a pivotal connection between long link 40 and driven member 25.

The opposite end of long link 40, best shown in Fig. 7, has four aligned projecting portions 50, 51, 52 and 53. These projecting portions have aligned openings 54.

The other main link of the toggle-joint arrangement is claw link 55. This link is shown in detail in Fig. 8. It is provided at one end with aligned projecting portions 56, 57 and 58 which respectively interfit between adjacent projecting portions of long link 40. The portions 56, 57 and 58 have aligned openings 59 which register with the openings 54 of long link 40 when the two links are assembled.

A shaft 60 passes through the openings 54 and 59 to establish a pivotal connection between long link 40 and claw link 55. It should be noted (Figs. 2 and 4) that the projecting portions of each link bear against arcuate recesses in the other link so that during the closing stroke no appreciable shear stresses are developed in shaft 60.

The opposite end of claw link 55 has a pair of vertically spaced claws 62 and 63 which comprise a hook portion. Each claw has a tip end 64 (Fig. 8) which cooperates with recess 22 during operation of the toggle-joint. The upper part of the hook portion, namely, claw 62, travels back and forth through relieved portion or channel 18 of rear stationary member 11 while the lower part of the hook portion, namely, claw 63, travels back and forth through relieved portion or channel 19 of member 11. At the same time, the portion 64a (Figs. 2 and 8) is limited as to outward movement by the guideway formed by the unrelieved portion of the lateral edge of central opening 17 and the inside surface 35 of the associated yoke arm 34. This eliminates the possibility that the toggle-joint will move over-center the wrong way during the closing stroke, thereby immobilizing the apparatus. It also insures proper positioning of claw link 55 for its engagement with shaft 20.

The toggle-joint is actuated by a pair of toggle-joint actuating links 65 and 66 which extend between the toggle-joint and driving member 28. The two links are duplicates, and one of them, link 65, is shown in Fig. 9. An opening 67 is provided in one end of the link and this opening receives the previously mentioned shaft 60, the shaft at the apex of the toggle-joint. The other end of link 65 has an opening 68 which receives a shaft 69 carried by driving member 28. The latter is recessed as shown in Fig. 6 to receive the end of link 65 which engages shaft 69.

Referring to Figs. 2 and 3, the operation of my apparatus will now be described. In Fig. 2 the parts of the apparatus are illustrated in fully retracted position, that is, driven member 25 is shown at its extreme right hand position. The toggle-joint is disengaged with claw link 55 out of engagement with shaft 20.

As piston 30 is moved to the left, connecting rod 29 correspondingly moves driving member 28 to the left. The forward surface of driving member 28 bears against adjacent portions of long link 40 and claw link 55 and correspondingly moves these two links to the left. This movement is communicated through long link 40 to driven member 25. Thus, during the initial portion of the forward stroke, driven member 25 moves to the left directly in accordance with the leftward movement of piston 30.

As this movement continues, the claws 62 and 63 of claw link 55 enter relieved portions or channels 18 and 19 and travel therethrough into engagement with the exposed rear surface of shaft 20. When the tip ends 64 of the claws engage shaft 20, to toggle-joint starts to become effective in the operation of the apparatus. Tip ends 64 first move toward and into recess 22 and later move in the opposite rotary direction. Continued movement of driving member 28 to the left causes claw link 55 to pivot about shaft 20. At first, the bearing relationship between driving member 28 and claw link 55 effects the pivoting motion, and later the action of the toggle-joint actuating links 65 and 66 completes the pivoting motion.

The final position of the toggle-joint parts is shown in Fig. 3, and it is to be noted that the length of links 65 and 66 is such that the two toggle-joints move "on center" so as to lock the joints in pressure applying condition. Generally aligned links 65 and 66 are effective to hold the joints in this position. Thus, the power may be removed from piston 30, and the apparatus will remain locked in pressure applying condition for any desired time period.

It will be understood that the design of this apparatus is such that tremendous pressure can be exerted between the movable and stationary members 25 and 10. The apparatus utilizes the mechanical advantage afforded by a toggle-joint, and the toggle-joint is constructed so that substantially all the pressures developed are compressive stresses. Shear stresses which seriously limit the pressure capabilities of prior machines of this character are substantially eliminated as far as the forward stroke is concerned.

The retractile stroke commences upon reversal in the fluid system to move piston 30 to the right. Substantial retractile forces are required only during the initial portion of the retractile stroke; that is, substantial forces are required to break the union between the two die portions. This initial portion of the stroke should have substantial length in order to accommodate deep draft dies.

The toggle-joint functions in reverse to provide substantial force during the initial portion of the retractile stroke. As driving member 28 moves to the right, toggle-joint actuating link 65 is effective to unlock the toggle-joint and move shaft 60 inwardly so as to jackknife the two main links 40 and 55 of the toggle-joint. The lateral surface of driving member 28 confines claw link 55 and insures that the latter properly pivots about shaft 20.

The pivoting relation of claw link 55 and shaft 20 is prolonged by reason of the entry of tip end 64 of the claws into recess 22. The prolongation of this pivoting action correspondingly prolongs the toggle action of the toggle-joint and increases the length of the retractile stroke during which substantial retractile force is provided.

When driving member 28 is retracted beyond the point where its lateral surface maintains claw link 55 in engagement with shaft 20, claw link 55 is disengaged from shaft 20. The claw link then travels through the relieved portions or channels 18 and 19 in rear stationary member 11 to or beyond (depending on the design dimensions used) the position shown in Fig. 2, thus completing a cycle of apparatus operation.

From the above description it is thought that the construction and advantages of my invention will be readily apparent to those skilled in the art. Various changes in detail may be made without departing from the spirit or losing the advantages of the invention.

Having thus described my invention, what I claim as new and desire to secure by Letters Patent is:

1. Pressure applying and locking apparatus comprising a framework having a front stationary member, a rear stationary member with a central opening therethrough, elongated bars connecting said members, a driven member slidingly carried by said bars, and a pair of shafts fixed on the front side of said rear stationary member, each shaft lying generally along a lateral edge of said central opening and engaging said stationary member throughout the shaft length, a portion of the lateral edge of said central opening being relieved through said stationary member to expose a portion of the rear side of said shaft and provide a channel, the relieved portion of said lateral edge being further relieved adjacent said shaft to provide a recess, a driving member adapted to travel back and forth through said central opening, a part-time disengageable toggle-joint between said driven member and each shaft, each toggle-joint comprising a long link pivotally connected at one end to said driven member and a claw link pivotally connected to the other end of said long link, said claw link having a hook portion at its free end adapted to travel through said channel in said rear stationary member, said hook portion having a tip end adapted to enter said recess to provide prolonged toggle action when said claw link engages and disengages said shaft, and a toggle-joint actuating link extending between said driving member and said toggle-joint, said driving member being shaped and disposed to impart movement directly to said claw link and said long link during the portion of the forward stroke prior to engagement of said claw link and said shaft, said claw link being guided by the unrelieved lateral edge of said central opening during this portion of the stroke and being guided by said driving member into bearing relation with said shaft prior to toggle action, said toggle-joint actuating link having a length providing "on center" movement of said toggle-joint for locking said apparatus in pressure applying position.

2. The combination of claim 1 with the addition of a pair of spaced guide members carried by and projecting rearwardly at right angles from said driven member, said guide members extending through openings in said driving member to maintain proper alignment between said driven and driving members.

3. In pressure applying and locking apparatus, the sub-combination comprising a rear stationary framework member having a central, generally rectangular opening therethrough, and a pair of shafts fixed on the front side of said member, each shaft lying generally along a lateral edge of said central opening and being supported by said member substantially throughout its length, a portion of each lateral edge of said central opening being relieved through said stationary member to expose a portion of the rear side of the associated shaft and provide a channel.

4. The combination of claim 3 wherein the relieved portion of each lateral edge of said central opening is further relieved adjacent said shaft to provide a recess.

5. In pressure applying and locking apparatus, a framework, a rear stationary framework member having a central, generally rectangular opening therethrough, a shaft fixed on the front side of said member along a lateral edge of said opening, a portion of said lateral edge being relieved to provide a channel, a driven member adapted to move back and forth in said framework, a toggle-joint having a long link pivotally attached to said driven member and a claw link adapted to pivot on said shaft, said claw link being disengageable from said shaft and movable away from said shaft and through said channel, and a guideway including a lateral edge of said central opening to establish the proper travel path for said claw link.

6. The combination of claim 5 wherein said channel includes the relieved portions in a lateral edge of the central opening in said rear stationary member, said relieved portions extending through said stationary member and exposing a portion of the rear side of said shaft, said channel being further relieved adjacent said shaft to provide a recess which cooperates with said claw link to prolong toggle action when said claw link engages and disengages said shaft.

References Cited in the file of this patent

UNITED STATES PATENTS

| | | |
|---|---|---|
| 2,186,030 | Lester | Jan. 9, 1940 |
| 2,407,978 | Eyles | Sept. 24, 1946 |
| 2,460,658 | Roehri | Feb. 1, 1949 |